United States Patent [19]

Dorgelo

[11] Patent Number: 4,845,705

[45] Date of Patent: Jul. 4, 1989

[54] SYSTEM FOR SEARCHING IDLE SWITCHING TIME SLOTS DEFINING A SELECTED FOUR-WIRE COMMUNICATION CONNECTION THROUGH A SWITCHING NETWORK WORKING ON THE BASIS OF TIME AND SPACE-DIVISION

[75] Inventor: Albertus Dorgelo, Hilversum, Netherlands

[73] Assignee: U.S. Philips Corporation, New York, N.Y.

[21] Appl. No.: 55,657

[22] Filed: May 28, 1987

[30] Foreign Application Priority Data

Jun. 2, 1986 [NL] Netherlands ..................... 8601413

[51] Int. Cl.⁴ ..................... H04Q 11/04; H04J 3/00
[52] U.S. Cl. ........................................ 370/58; 370/63
[58] Field of Search ............ 370/58, 60, 64, 67, 370/63, 65, 94, 84

[56] References Cited

U.S. PATENT DOCUMENTS 4,213,201  7/1980  Gagnier et al. ................ 370/66
4,701,907 10/1987  Collins ........................... 370/63
4,718,058  1/1988  van Vugt ........................ 370/63

Primary Examiner—M. H. Paschall
Attorney, Agent, or Firm—Thomas A. Briody; Jack E. Haken; Anne E. Barschall

[57] ABSTRACT

A control arrangement for controlling and coordinating the required switching operations in a switching network is designed among others to search idle switching time slots which can be used for a requested four-wire communication connection. Thereto a recording memory is used for continuously recording for each time switch the idle-busy condition of switching time slots. During the search for idle switching time slots for a four-wire communication connection which has to be established via separate time switches at the input of the network, at least one pair of idle locations in the recording file which can be suitable for a four-wire communication connection that has to be established via one and the same time switch is skipped and reserved before a pair of idle locations in this recording file representative of the searched switching time slots for the requested connection that has to be established via separate time switches, is seized. This creates the possibility of making the chance of blocking for connections that have to be established via separate input time switches (external group connection) virtually equal to the chance of blocking for connections that have to be established via one and the same input time switch of the network (internal group connections).

5 Claims, 5 Drawing Sheets

4,845,705

SYSTEM FOR SEARCHING IDLE SWITCHING TIME SLOTS DEFINING A SELECTED FOUR-WIRE COMMUNICATION CONNECTION THROUGH A SWITCHING NETWORK WORKING ON THE BASIS OF TIME AND SPACE-DIVISION

BACKGROUND OF THE INVENTION

The invention relates to a system for searching idle switching time slots defining a selected four-wire communication connection through a switching network working on the basis of time and space-division. The network is of the type wherein switching operations in time domains are carried out by time switches at the input and output of the network, and switching operations in the space domain are carried out in between these time switches. This network comprises a number of address registers each suitable for address-controlled reading out of the time switches associated to the address registers; and a control arrangement required for controlling and coordinating the necessary switching operations. This control arrangement is designed for searching idle switching time slots which can be utilized for a requested four-wire communication connection by means of a recording memory. The recording memory records for each time switch the idle/busy condition of switching time slots, under the control of which the time switches associated to the address registers are read out. A switching time slot is to be regarded as a time interval during which a relevant time switch is read out at a specific address position and the thus read speech sample is conveyed from the transmit end to a receive end of a relevant four-wire communication.

Generally, each main group comprising several groups of time channels is associated with an input time switch for traffic due to enter the switching network, and an output time switch for traffic due to leave the switching network. Thereto the switching network is of such a configuration and connected to the groups of time channels such that a four-wire communication connection can be formed between time channels belonging to one and the same group as well as between time channels belonging to different groups. Such a four-wire communication connection is composed of a pair of two-wire connections which are generally established on two different, correlated switching time slots. If traffic load is offered to a switching network of the type described hereinbefore, more specifically, if this network has a correlated go and returnpath, and if no further measures are taken, the chance of blocking will be considerably higher if not unacceptably higher for requested internal group connections, i.e. communication connections between the channels of one and the same group, than the blocking chance for external group connections, i.e. communication connections between time channels of different groups. As a compromise, the total number of time channels operated by the switching network could be selected to be lower than the number of channels for which the switching network was originally designed. However, such a selection is unacceptable as in that case the available hardware will not be used to full capacity.

SUMMARY OF THE INVENTION

The invention has for its object to design a system of the type mentioned above such that the chance of blocking is virtually equally great for the two above-mentioned communication connections whilst using the available means to full capacity.

The invention is based on the understanding that with the currently used procedure of searching free switching time slots for establishing a requested four-wire communication connection, the switching time slot combinations suitable for a possible internal group connection can be unnecessarily occupied when searching free switching time slots for a requested external group connection.

Based on this idea, a system of the type mentioned above and in accordance with the invention is characterized in that during the search for idle switching time slots for a four-wire communication connection, this connection passing through different time switches at the input of the network (external group connection), at least one pair of idle locations in the recording memory is skipped and reserved. This pair might be suitable for a four-wire communication connection passing through one and the same time switch (internal group connection). The skipping and reserving occurs before a pair of idle locations in the recording memory representative of the searched switching time slots for the aforesaid four-wire communication connection passing through different time switches is occupied.

A preferred embodiment of a system in accordance with the invention is characterized in that during searching for idle switching time slots for a four-wire communication connection passing through different time switches at the input of the network, the files of the recording memory involved in this four-wire communication channel are searched for any r/r' combination with $r'=r+1$ where r is a recording memory location representative of an even-numbered switching time slot for the one time switch, and r' is a recording memory location representative of an odd-numbered switching time slot for the other time switch; and with $r'=r-1$ where r is a recording memory location representative of an odd-numbered switching time slot for the one time switch and r' is a recording memory location representative of an even-numbered switching time slot for the other time switch.

A further detailed system in accordance with the invention is characterized in that a pair of idle recording memory locations which is representative of switching time slots suitable for a(n) (external group) four-wire communication connection passing through different time switches at the input of the network is skipped and reserved, if a nearest suitable recording memory location which is representative of a switching time slot required for the alternative (internal group) four-wire communication connection is idle; and two pairs of idle recording memory locations are skipped and reserved if these locations are representative of the switching time slots suitable for the two alternative (internal group) four-wire communication connections.

In a system in accordance with the invention, searching free switching time slots is carried out according to the flow chart as illustrated in the FIGS. 5 and 6.

BRIEF DESCRIPTION OF THE DRAWING

The invention will hereinafter be further explained with reference to the drawings wherein.

DETAILED DESCRIPTION OF THE PREFERRED EMBODIMENT

Figure 1:
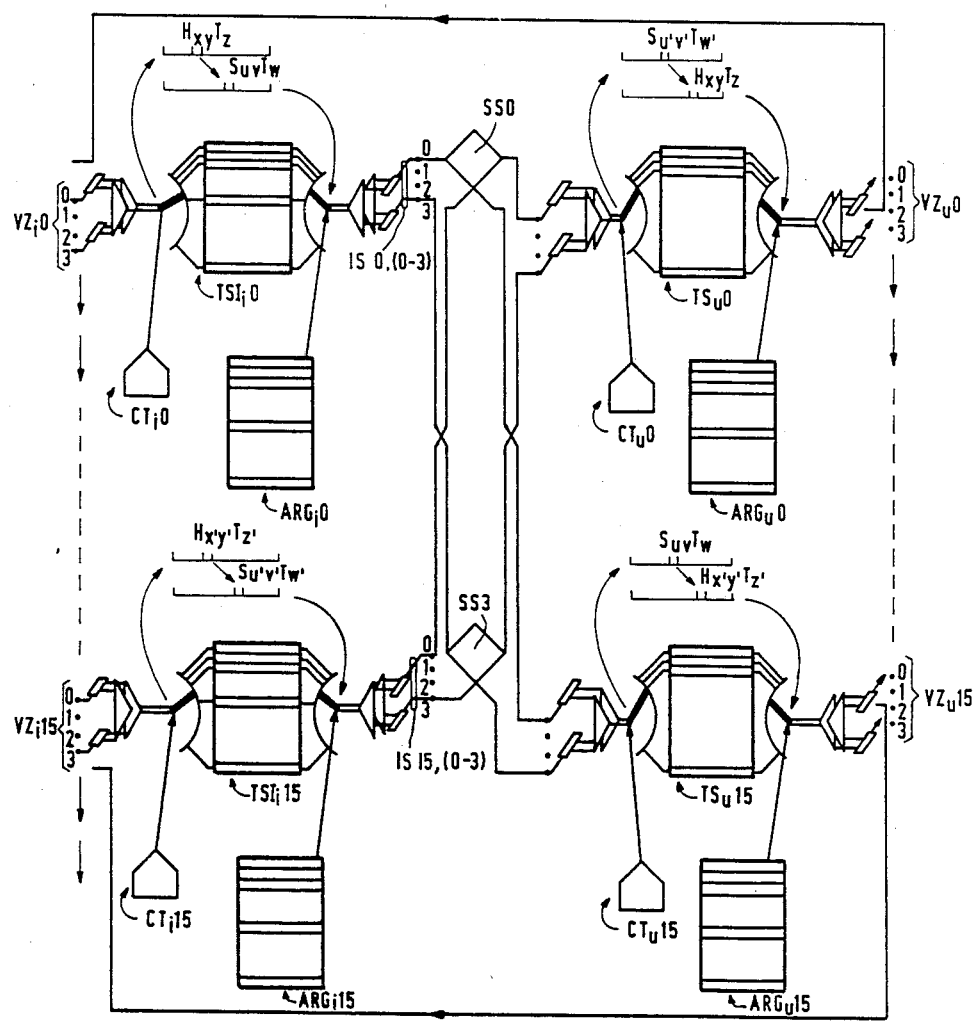
FIG. 1 shows a simplified diagram of an embodiment of a switching network operating on the basis of time and space division in which the invention can be used.

The embodiment of the invention according to FIG. 1 is shown for the purpose of illustration of a switching network operating on the basis of time and space division and having a capacity of 16 groups $VZ_i0-15/VZ_u0-15$ of time channels. The index i/u indicates the position of the relevant arrangement i.e. at the input (i) or at output (u). Each one of such groups of the represented embodiment contains 512 time channels subdivided over four transmission lines, 0, 1, 2, 3, each accommodating 128 time channels. Each one of these time channels can be represented by $H_{xy}T_z$ with $x=0, \ldots, 15$; $y=0, \ldots, 3$ and $z=0, \ldots, 127$.

The samples of the time channels can be cyclically read into an input time switch $TSI_i(0-15)$ extended to the relevant group and being under the control of a relevant counter $CT_i(0-15)$. The contents of each time channel is written and recorded there by way of a word, in this embodiment containing 16 bits. Thus each one of the time switches contains 512 address locations allowing of storing one time-channel-sample each.

An address register generator $ARG_i(0-15)$ is extended to each one of these time switches $TS_i(0-15)$. The time-channel-sample cyclically read for $TSI_i0$ in the order of $H_{00}T_0, H_{01}T_0, H_{02}T_0, H_{03}T_0, H_{00}T_1, \ldots H_{03}T_{127}$ can be read out acyclically or address-controlled under the control of such an address register/generator. For $TSI_ik$ the order of $H_{ko}T_0, H_{ki}T_0$, etc. likewise holds. Each address register/generator has a capacity of 512 locations, each one designed to accommodate a 9-bit address word. A relationship is established by such an address register/generator between a time-channel-sample in the relevant time switch on one side and on the other an intermediate slot and a switching time slot conveying this time-channel-sample to the switching stage operating on the basis of space division, this stage according to embodiment 4 containing $16 \times 16$ switching sections SS(0-3).

In the embodiment represented hereinafter for each group of time channels 512 switching time slots are available, divided over four intermediate slots IS(0-3), and allowing of setting up a connection to the rows of the switching stage operating on a time division basis. These switching time slots are indicated as $S_{uv}T_w$, with $u=0, \ldots, 15$; $v=0, \ldots, 3$; and $w=0, \ldots, 127$. Each address register/generator ARG is designed to produce the addresses stored therein in the order of $S_{00}T_0, S_{01}T_0, S_{02}T_0, S_{03}T_0, \ldots S_{03}T_{127}$ (this order more specifically applies to the address register/generator extended to the group $VZ_i0$). Each intermediate slot available to a group accomodates 128 switching time slots with these intermediate slots giving access to the relevant rows of the switching sections SS(0-3).

Each one of these switching sections is controlled by two address generator groups (not shown) each controlling eight columns of the relevant switching section. Each one of these address generator groups basically contains $8 \times 128$ switching address generators. Each switching address generator is directly extended to a column and contains the addresses of the row which has to be switched through during a specific switching time slot interval. Each row of a switching section can be connected to a specific column for the length of a switching time slot period. Each column of a switching section is coupled to one of 16 output time switches $TS_u(0-15)$ via a relevant intermediate slot. The samples originating from a relevant switching section can be cyclically read into the relevant output time switch $TS_u(0-15)$ under the control of a counter $CT_u(0-15)$. The output time switches are designed similarly to the input time switches. Each one of these time switches thus has a capacity for storing 512 time channel samples stored by means of words containing 16 bits. Like the input time switches each one of the output time switches $TS_u(0-15)$ can be read address-controlled under the control of an address register/generator $ARG_u(0-15)$ extended thereto. Each individual address register/generator has a capacity of 512 9-bit address words for indicating the locations where the extended output switch $TS_u$ has to be read out.

In a switching network configuration of the type described hereinbefore the switching operations in the time domain are carried out by the input time switches and the output time switches, the switching operations in the space domain being carried out by the switches therebetween operating on a space division basis. Thus a four-wire communication connection can be set up between any arbitrary pair of time channels $H_{xy}T_z$ and $H_{x'y'}T_{z'}$. For such a connection between time channels of different groups such as, for example, the groups $VZ_i0$ and $VZ_i15$, the input time switch $TS_i0$, the switching section SS0, the output time switch $TS_{u15}$ (for the go path) and the input time switch $TS_i15$, the switching section SS0 and the output time switch $TS_u0$ (for the return path) can be used. Such a connection will hereinbelow be further indicated as an external group connection. For a connection between two time channels belonging to one and the same group such as for example $VZ_i0$, the input time switch $TS_i0$, the switching section SS0 and the output time switch $TS_u0$ can be used. Such a connection will be further indicated hereinbelow as an internal group connection. In the embodiment according to FIG. 1 for each time channel $H_{xy}T_z$ four different intermediate stages IS(0-3) and four different switching sections SS(0-3) are available for connecting the time channel between the input side or transmit side of the network and the output side or receive side of the network. Each one of the intermediate slots, as observed before, accommodates 128 switching time slots $S_{uv}T_w$ with $u=0, \ldots, 15$; $v=0, \ldots 3$; and $w=0, \ldots, 127$. Thus for each of the groups $VZ_i(0-15)$ there are $4 \times 128$ switching time slots available for conveyance from the input side to the output side of the network.

For a requested four-wire communication connection between two time channels $H_{xy}T_z$ and $H_{x'y'}T_{z'}$ a switching time slot for the go path and a switching time slot for the return path have to be assigned to these two time channels. If an external group connection is requested, for example, between a time channel of the group 0 and the time channel of the group 15 1 an idle switching time slot has to be searched and assigned of the group $S_0(0-3)T_{0-127}$ and a switching time slot of the group $S_{15}(0-3)T_{0-127}$.

Figure 2:
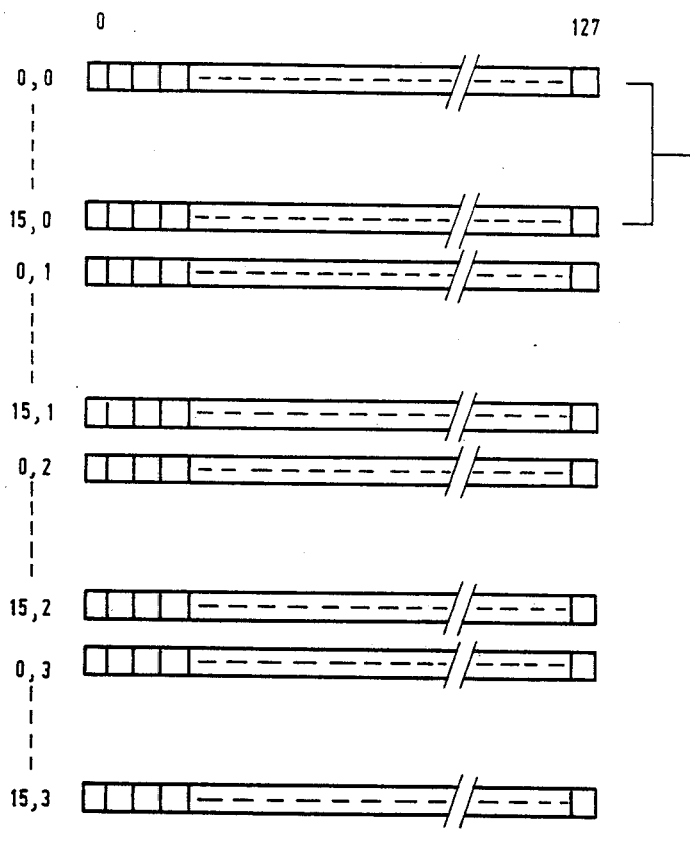
FIG. 2 shows a diagram to illustrate the principle according to which the idle-busy recording memory is searched when an external group connection is requested.
Figure 2:
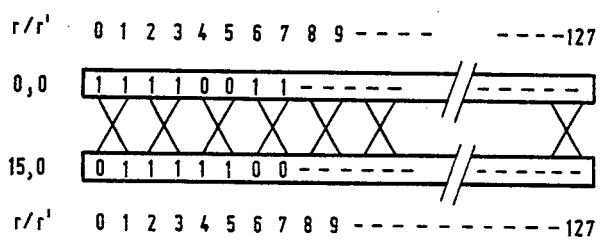

Thereto the exchange comprising the switching network likewise comprises a recording memory. The idle-busy condition of the switching time slots are continuously recorded therein. More specifically, a recording memory field is added to each of the intermediate slots. To simplify the searching procedure it is to be recommended to sequentially arrange the memory fields corresponding to the switching time slots conveyed through one and the same switching sections SS(0-3). An embodiment of the way in which the recording memory is thus subdivided is schematically shown in FIG. 2. Each memory field such as for example 0.0 contains 128 locations. Each of these locations represents a switching time slot. If such a switching time slot is busy or idle this is indicated in the relevant location by a respective "0" and a "1". The 16 memory fields such as for example 0.0 . . . 15,0 represent 16×128 switching time slots available to 16 different groups and conveyed through one and the same switching section SS0. In a similar manner the 16 memory fields such as for example 0.2 . . . 15,2 represent 16×128 switching time slots available to 16 different groups and conveyed through one and the same switching section SS2.

In order to meet a request for an external group connection, for example, between a time channel of a group 0 and a time channel of a group 15 the respective recording memory field 0,0 and 15,0; 0,1 and 15,1; 0,2 and 15,2; 0,3 and 15,3 should be searched for a pair of idle time slots. Realisation hereof need not necessarily take place by means of searching amongst switching time slots passing through switching section SS0. For example it can be determined at random in which switching stage SS(0-3) the search operation is started. More specifically, in the recording memory field 0,0 an idle switching time slot r is searched for transport from input time switch $TS_i0$ to the output time switch $Ts_u15$, whilst in the memory field 15,0 a switching time slots r' is searched for transport from the input time switch $TS_i15$ to the output time switch $TS_u0$. Just because a fixed relationship between such a pair of switching time slots is generally assumed, the problem of a larger internal blocking will occur. This relationship, for example, is expressed by $r'=r+1$, where r is a memory location representing an even-numbered switching time slot and by $r'=r-1$ where r is a memory location representing an odd-numbered switching time slot. This principle of searching is shown in FIG. 2 for the recording memory fields 0,0 and 15,0. The diagram shows that any pair of memory locations interconnected by one of a pair of intersecting lines can be suitable for a requested external group connection. Each pair of intersecting lines likewise indicates that there are basically two options for each requested external group connection. For example the pair of switching time slots corresponding with the locations r/r' 0,0; 0 and 15,0; 1 is available indeed for a requested external group connection (four-wire) whereas the other pair represented by the locations 0,0; 1 and 15,0; 0 is not available for this requested connection. It is likewise indicated that for example the pairs 0,0; 2-15,0; 3 and 0,0; 3 and 15,0; 2 are both available for a requested external group connection. The pairs 0,0; 4-15,0; 5 and 0,0; 5-15,0; 4 further illustrate the case wherein the two options for a requested external group connection are unavailable. The same holds for the pairs 0,0;6-15,0;7 and 0,0;7-15,0;6. It will further be evident that for the embodiment described with an external group connection being requested for time channels in the groups 0 and 15, the recording memory field pairs 0,0-15,0; 0,1-15,1; 0,2-15,2; and 0,3-15,3 have to be searched in the abovedescribed manner so as to check all available (512) options.

Figure 3:
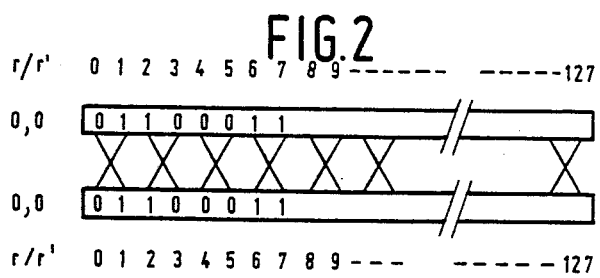
FIG. 3 shows a diagram to illustrate the principle according to which the idle-busy recording memory is searched when an internal group connection is requested.

There will be a different situation if an internal group connection is requested. For example, if between two time channels belonging to one and the same group for example $VZ_iO$ a four-wire communication connection has to be established, the time switches $TSI_i0$, $TSI_u0$ and the switching sections SS(0-3) of the shown embodiment are available thereto. In this situation one and the same recording memory field has to be searched each time for a pair of idle switching time slots suitable for such an internal connection. Each of the memory fields 0,0; 0,1; 0,2; and 0,3 can comprise a pair of idle switching time slots suitable for such a requested internal connection. FIG. 3 shows the searching process for the recording memory field 0,0. The difference between this situation and the situation represented in FIG. 2 is the fact that in FIG. 3 the same memory field has to be drawn twice. Here too is started from the fixed relationship $r'=r+1$ for an even value of r and $r'=r-1$ for an odd value of r. As in this case r' is actually identical to r the number of pairs of idle switching time slots suitable for such an internal group connection is equal to half the number of switching time slots suitable for an external group connection. Worded differently, a single pair of switching time slots is indicated be each pair of intersecting lines in FIG. 3. In the embodiment shown in FIG. 3 only the pair 0,0;6-0, 0;7 is available for a requested internal group connection between time slots of the group 0. FIG. 3 thus illustrates that for such an internal group connection only pairs of idle suitable "neighbouring" locations are capable of forming such a connection. By comparing FIGS. 2 and 3 it likewise appears that without further measures the chance of blocking can be considerably larger for internal group connections than for external group connections.

The invention is based on the understanding that the chances of blocking for both these types of connections can be balanced more if such pairs of idle "neighbouring" switching time slots potentially suitable for an internal group connection, are skipped when searching idle switching time slots for a requested external group connection. This implies that in accordance with the invention the process of searching and assigning switching time slots to time channels belonging to different groups, is organised such that at least one pair of such idle locations in either the one memory field or the other memory field or in both is skipped and reserved for a possible internal group connection. If, subsequently, every possibility for the requested external group connection has been explored without a pair of idle switching time slots being found, a pair of idle switching time slots that can be used for this connection is then selected from the reserved slots. It has further appeared that in many cases only one pair of such idle memory locations needs to be skipped before the next pair of idle locations suitable for the requested external group connection is seized.

More specifically, the system in accordance with the invention is designed such that during a search operation for idle switching time slots for a requested external group connection, one or a plurality of pairs of idle switching time slots suitable for such a connection is-/are skipped and kept in reserve if one or both switching time slots of the complementary pair, this is the pair of switching time slots via which the alternative external group connection can be formed, is/are idle.

In the situation represented in FIG. 2 this is the case with memory fields 0,0 and 15,0 for the pair (0,0;0-15,0;1) and the pairs (0,0;2-15,0;3) and (0,0;3-15,0;2). When skipping the pair mentioned first (0,0;0-15;0;1) the possibility is kept open for an internal group connection within group VZ0 via the two switching time slots associated with the recording memory locations 0,0;0 and 0,0;1. By skipping the latter two pairs (0,0;2-15,0;3) and (0,0;3-15;2) the possibility is kept open for two internal group connections namely the one connection via the switching time slots added to locations 0,0;2 and 0,0;3 within the group VZ0 and the other connection via the switching time slots added to locations 15,0;2 and 15,0;3 within the group VA15.

Figure 4:
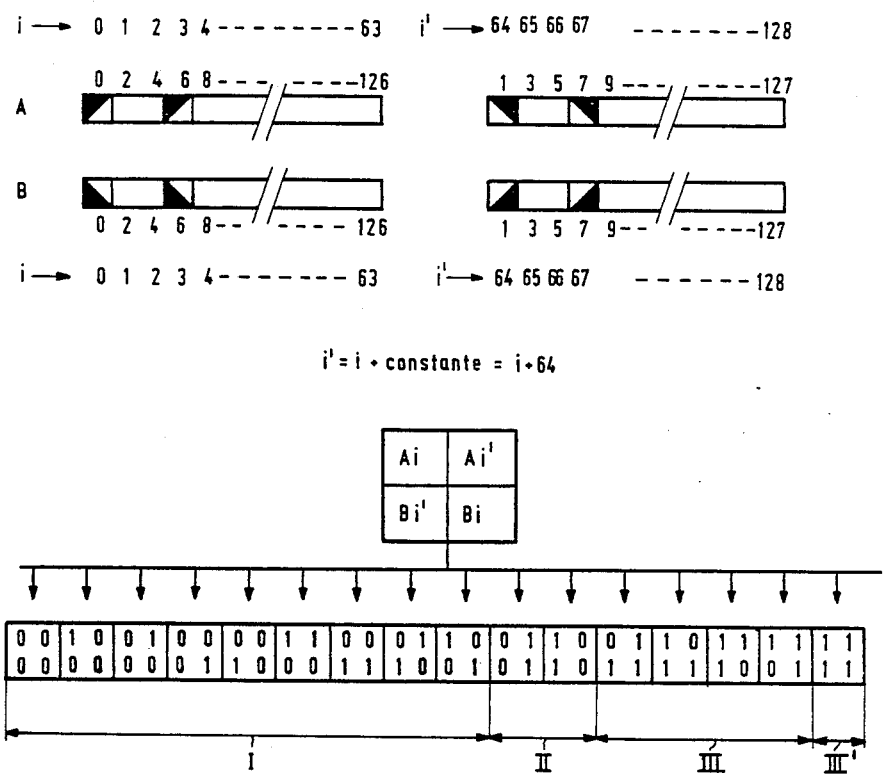
FIG. 4 shows a diagram wherein a further explanation is given of the diagram according to FIG. 2.

FIG. 4 illustrates the way in which two recording memory fields, such as for example 0,0 and 15,0 for clarity further indicated by A and B, are searched. Thereto each of these recording memory fields is subdivided into two equal portions. The one portion in the shown embodiment contains 64 locations i, with i=0,1, ... 63, each location representing an even-numbered switching time slot. The other portion likewise contains 64 locations i' with i'=i+(constant)=i+64, each location representing an odd-numbered switching time slot. With each search cycle four memory locations (quartet) Ai, Bi', Ai', Bi are examined in accordance with the strategy indicated hereinbefore of r'=r+1 and r'=r−1. For completeness FIG. 4, top half, shows two such quartets by way of illustration i.e. the locations A0-B64, A64-B0 and A3-B67; A67-B3. For each such quartet 16 different configurations are possible with external group connections as is represented in FIG. 4, bottom half. If a type I configuration is detected, there will be no external group connection possible and a next quartet can be searched. If a type II configuration is detected the relevant idle pair of memory field locations will be declared busy and the switching time slots added thereto will be assigned to the relevant requested external group connection. If a type III configuration is detected the relevant pair of idle locations will be reserved and one or more following quartets will be searched with the next pair of idle locations being declared busy and the switching time slots added thereto being assigned to the requested external group connection. If a type III' configuration is detected both pairs of idle locations will be reserved and one or more following quartets will be searched with the next pair of idle locations being declared busy and the switching time slot added thereto being assigned to the requested external group connection. If, for example, the type III configuration is detected shown rightmost in the bottom half of FIG. 4, the idle pair of locations Ai'-Bi will be reserved and the next idle pair of locations of an other quartet will be declared busy with the switching time slots added thereto being signed to the requested external group connection. If, subsequent to a search pulse wherein a reservation is made, no idle pair of locations is found during the rest of the search procedure, the reserved pair of locations will be declared busy and the switching time slots added thereto will be assigned to the requested external group connection. If no pair of idle locations is found after going through all the available possibilities, an indication will be given that the requested external group connection cannot be established.

Figure 5:
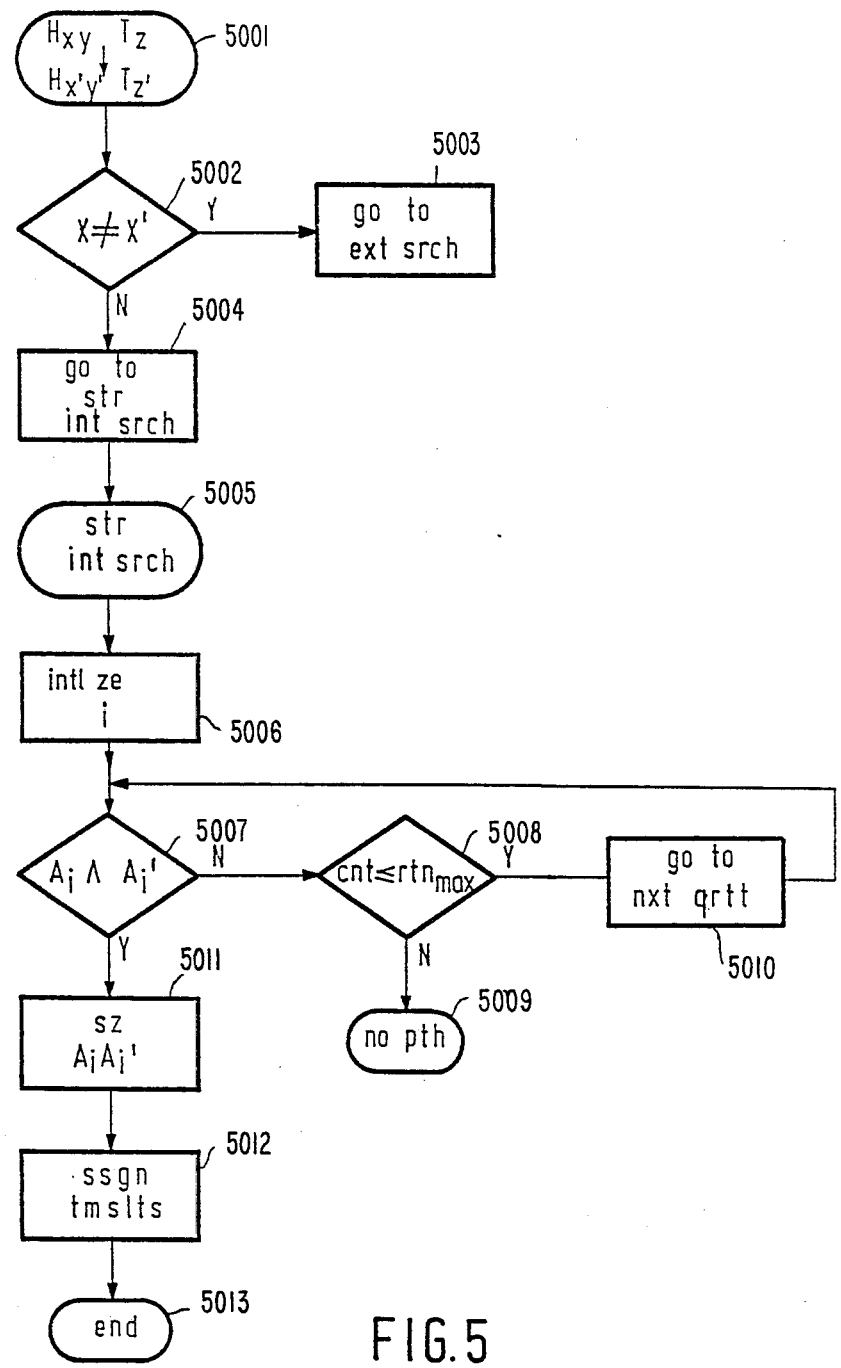
FIG. 5 shows a flowchart to illustrate an implementation of the system in accordance with the invention.
Figure 6:
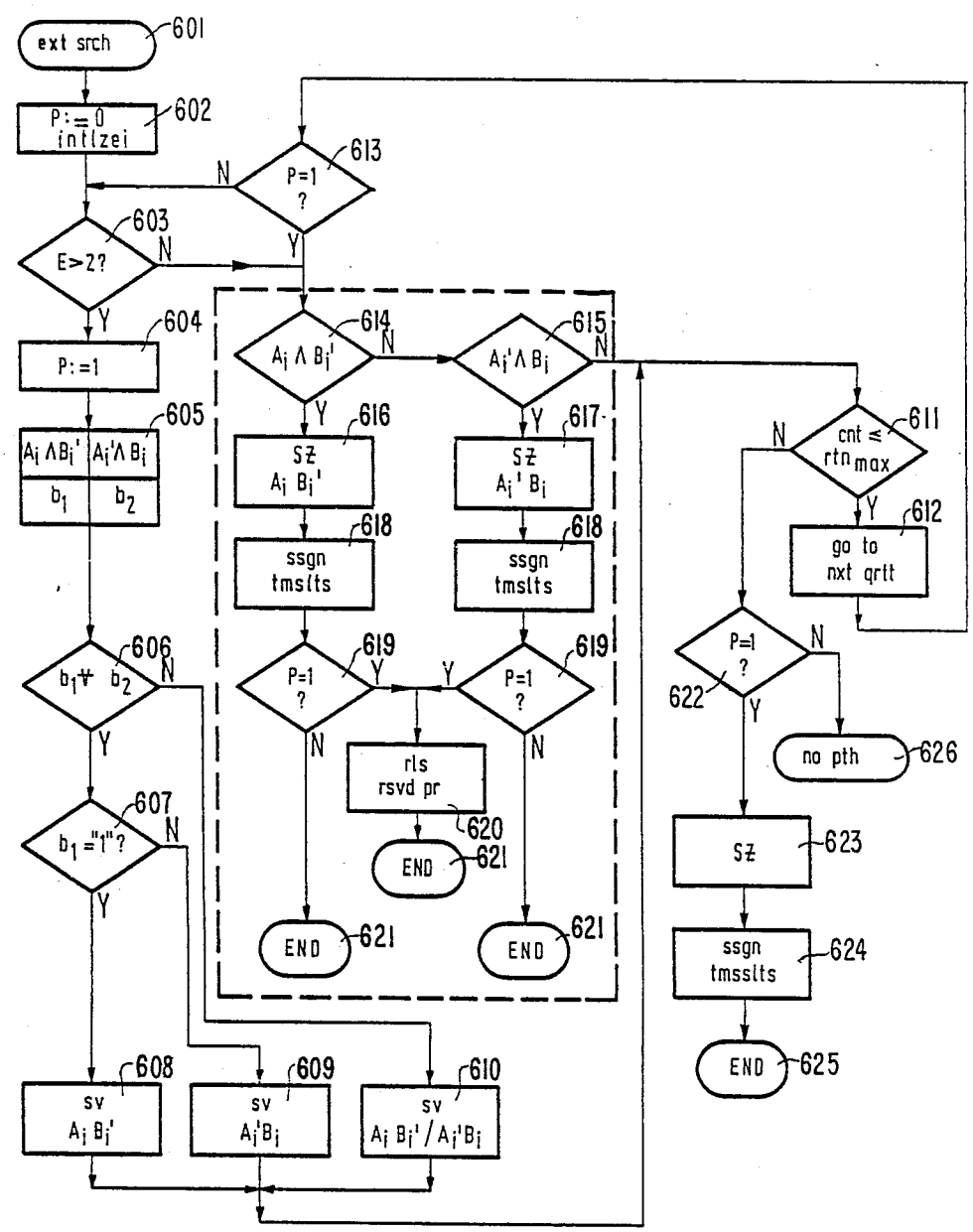
FIG. 6 shows a flowchart to further illustrate the implementation of the system in accordance with the invention.

The flowcharts shown in FIGS. 5 and 6 and being considered in connection with the relevant table and legends, represent a possible implementation of a searching system in accordance with the invention.

After a call has come in 5001, the source-destination relationship which exists between a calling time-channel and a called time-channel is known. From this information can be deduced 5002 the identities of the time switches via which the relevant requested connection has to pass as well as the identities of the recording memory fields to be searched for idle locations. In the first instance it is thus established whether an incoming call requests a four-wire communication connection between time channels belonging to one and the same group (internal connection) 5004, 5005, or a four-wire communication connection between time channels belonging to different groups (external connection) 5003. The flowchart in accordance with FIG. 5 represents the procedure of searching memory field locations with relevant idle switching time slots for an internal group connection 5006. Thereto memory field locations of memory fields added to one and the same time switch are searched pairwise. For the situation depicted in FIG. 4 this means, for example, for memory fields A that a search 5007 is made according to Ai-Ai'. By combining the contents of such a pair of locations according to an AND function, it can be established whether the searched pair represents a pair of switching time slots which is available or not available for the requested internal connection. If such an operation of AND functioning gives "true", the relevant pair of memory field locations will be declared busy 5011 and the added switching time slots will be assigned to the requested internal group connection 5012. If such an operation of AND-functioning results in "false", the next pair will be searched 5010. This operation is continued until an idle pair of locations is found. If after checking every available possibility no "true" is found, an indication 5009 will be given that the requested internal group connection cannot be established.

After finding that an incoming call requests an external group connection the flowchart according to FIG. 6 is passed through. Therewith it is established for each searched quartet of recording memory field positions whether the available configuration belongs to one of the categories described in FIG. 4. In dependence on the configuration found the searching procedure is continued or stopped. If the number of times one has returned to the start of the flowchart via "to next quartet" 612 has reached a predetermined limit value at 611, an indication is given that the requested external connection cannot be established 626.

The invention is not confined to the aforedescribed embodiments. For example the invention can also be applied to a switching network configuration of the type commonly referred to as TSSST having a capacity of 65536 duplex gates.

Herewith the chance of blocking is generally smaller than $10^{-5}$ with a traffic volume of a 0.8 Erlang per gate.

Appendix 5001

Legends of FIG. 5

5001 = source $H_{xy}T_z$ calls destination $H_{x'y'}T_{z'}$;

5002 = do source and destination belong to different groups x, x'?

5003 = go to search procedure for external connection (FIG. 6);

5004=go to search procedure for internal connection;
5005=start search procedure internal connection;
5006=initiate parameter i;
5007=AND function in Ai and Ai';
5008=is the number of returns ≦ maximum value?
5009=request for connection not accepted;
5010=go to next quartet;
5011=seize idle pair AiAi';
5012=assign switching time slots for requested connection;
5013=end of search procedure.

Appendix 2

Legends on FIG. 6

601=start of search procedure for external group connection;
602=initiate p;
603=is number of "ones" E in quarter>2?
  output N: quartet is type I or II;
  output Y: quartet is type III or III'
604=let p be 1;
605=AND function in AiBi' and store result in buffer 1
  AND function in Ai'Bi and store result in buffer 2
606=EXOF function in buffers 1 and 2
607=is contents of buffer 1 equal to "one"?
608=reserve pair AiBi'
609=reserve pair Ai'Bi
610=reserve pair AiBi' and Ai'Bi
611=is the number of returns ≦ maximum value?
612=proceed to next quartet
613=has p the value 1? output N: proceed with "3"
  output Y: proceed with "14"
614=AND function in AiBi'
  output Y: quartet is type II
  output N: quartet is type I or II
  output Y: quartet is of type II
  output N: quartet is of type I
615=AND function in Ai'Bi
616=seize idle pair AiBi'
617=seize idle pair Ai'Bi
618=assign switching time slots for requested connection
619=has p value 1?
620=release the non-reserved pair
621=end of search procedure
622=has p the value 1?
623=seize the reserved pair;
  seize the reserved pair or one of the reserved pairs
624=assign switching time slots for requested connection
625=end of search procedure
626=request for connection is not accepted.

What is claimed is:

1. A method for searching idle switching time slots defining four-wire communication connections through a switching network, which network includes:
(a) input lines;
(b) output lines;
(c) a first plurality of groups of time domain switches coupled with the input lines;
(d) a second plurality of groups of time domain switches coupled with the output lines;
(e) a plurality of space domain switches coupled between the first and second pluralities of time domain switches;
(f) first and second pluralities of address registers coupled with respective ones of the groups of time domain switches, which address registers control reading out of the respective groups of time domain switches using addresses;
(g) a recording memory comprising a plurality of locations for recording whether respective time slots are idle or busy, herein a location will be said to be idle when a respective time slot is idle; and
(h) means for controlling the time and space domain switches, the controlling means searching idle switching time slots using the recording memory;
the method comprising the step of:
(i) searching for idle switching time slots for a first four-wire communication connection which passes through first and second distinct ones of the groups of time domain switches at the input of the network, which searching step comprises the steps of:
(A) reserving and skipping at least one first pair of idle locations in the recording memory; and
(B) further searching for a second pair of idle locations, the second and at least one first pairs both being suitable for the first connection and the at least one first pair also being suitable for at least one second four-wire connection which passes through a single one of the first and second distinct groups of time domain switches, so that the second pair is usable for the first connection;
(C) if the second pair is found, assigning a time slot corresponding to the second pair to the first four-wire connection.

2. The method of claim 1 wherein the searching step comprises seeking recording memory locations having an r/r' combination of:
(a) r'=r+1, when r is a recording memory location representative of an even-numbered switching time slot for the first distinct group of time domain switches and r' is a recording memory location representative of an odd-numbered switching time slot for the second distinct group of time domain switches; and
(b) r'=r−1, when r is a recording memory location representative of an odd-numbered switching time slot for the first distinct group of time domain switches and r' is a recording memory location representative of of an even-numbered time slot for the second distinct group time domain switches.

3. The method of claim 1 wherein said reserving and skipping steps comprise:
(a) reserving and skipping one said first pair, when a nearest suitable recording memory location which is representative of the second connection is idle; and
(b) reserving and skipping two said first pairs, when said two said first pairs are suitable for first and second second connections, said first second connection using only the first distinct time domain switch and said second second connection using only the second distinct time domain switch.

4. The method of claim 2 or 3 comprising the following steps in the following sequence
(a) calling (5001) for a connection between destination $H_{x'y'T_{z'}}$ and source $H_{xy}T_z$;
(b) testing (5002) whether the source $H_{xy}T_z$ and destination $H_{x'y'}T_{z'}$ belong to distinct groups x, x' of time domain switches;
(c) if a result of step (b) is positive, going (5003) to a procedure for searching for external connections;

(d) if a result of step b is negative, going (5004) to a procedure for searching for internal connections; the procedure for searching for internal connections:
(e) initializing (5006) parameters i and i';
(f) anding (5007) contents of memory locations $A_i$ and $A_{i'}$;
(g) if a result of step (f) is negative
  (I) testing (5008) whether a number of returns to step (e) is less than or equal to a maximum value;
  (II) if a result of step (g)(I) is positive, getting (5010) a new quartet of memory locations $A_i$, $A_{i'}$, $B_i$, and $B_{i'}$ by changing values of i and/or i';
  (III) if a result of step (g)(I) is negative, indicating (5009) that there is not path between the destination $H_{x'y'}T_{z'}$ and the source $H_{xy}T_z$;
(h) if a result of step (f) is positive
  (I) seizing (5011) an idle pair $A_iA_{i'}$;
  (II) assigning (5012) switching time slots corresponding to the seized pair for the connection between the destination $H_{x'y'}T_{z'}$, and the source $H_{xy}T_z$;
the procedure for searching for external connections:
(i) initializing (602) a parameter P to zero;
(j) testing (603) whether a number E of ones in a current quartet is greater than two;
(k) if the result in step (j) is positive,
  (I) characterizing a current quartet as type I or II;
  (II) setting (604) P to one;
  (III) anding (605) contents of memory locations $A_i$ and $B_{i'}$, and storing a result in buffer b1;
  (IV) anding (605) contents of memory locations $A_{i'}$ and $B_i$, and storing a result in buffer b2;
  (V) exclusive oring (606) contents of buffers b1 and b2;
  (VI) if a result of step (k)(V) is positive,
    (A) testing (607) whether buffer b1 contains one;
    (B) if a result of step (k)(VI)(A) is positive, reserving (608) a pair of recording memory locations $A_iB_{i'}$;
    (C) if a result of step (k)(VI)(A) is negative, reserving (609) a pair of recording memory locations $A_{i'}B_i$;
  (VII) if a result of step (k)(V) is negative, reserving (610) two pairs $A_iB_{i'}/A_{i'}B_i$ of recording memory locations
  (VIII) going to step (1)(IV)(C)(α);
(1) if the result in step (j) is negative,
  (I) characterizing the current quartet as type III or III';
  (II) anding (614) contents of memory locations $A_i$ and $B_{i'}$;
  (III) if a result of step (I)(II) is positive,
    (A) seizing (616) a pair of recording memory locations $A_iB_{i'}$;
    (B) assigning (618) switching time slots for the connection between the destination $H_{x'y'}T_{z'}$ and the source $H_{xy}T_z$;
    (C) testing (619) whether P=1;
    (D) if a result of step (1)(III)(C) is positive, releasing (620) a non-reserved pair;
  (IV) if a result of step (1)(II) is negative,
    (A) anding (615) contents of memory locations $A_{i'}$ and $B_i$;
    (B) if a result of step (1)(IV)(A) is positive,
      (α) seizing (617) a pair of memory locations $A_{i'}B_i$;
      (β) assigning (618) switching time slots corresponding to the seized pair for the connection between the destination $H_{x'y'}T_{z'}$ and the source $H_{xy}T_z$;
      (γ) testing (618) whether P=1;
      (δ) if a result of step (1)(IV)(B)(γ) is positive, releasing (620) a non-reserved pair;
    (C) if a result of step (1)(IV)(A) is negative
      (α) testing (611) whether a number of returns is less than or equal to a maximum value;
      (β) if a result of step (1)(IV)(C)(α) is positive:
        (1) proceeding (612) to a next quartet;
        (2) testing (613) whether P=1;
        (3) if a result of step (1)(IV)(C)(β) (2) is positive going to step (j);
        (4) if a result of step (1)(IV)(C)(β) is negative going to step (1)(II);
      (γ) if a result of step (1)(IV)(C)(α) is negative:
        (1) testing (622) whether P=1;
        (2) if a result of step (1)(IV)(C)(γ) (1) is negative, indicating (626) that there is no path between the destination $H_{x'y'}T_{z'}$ and the source $H_{xy}T_z$;
        (3) if a result of step (1)(IV)(C)(γ) (1) is positive:
          (a) seizing (623) the reserved pair or one of reserved pairs;
          (b) assigning (624) switching time slots corresponding to the seized pair for the connection between the destination $H_{x'y'}T_{z'}$ and the source $H_{xy}T_z$.

5. The method of claim 1 comprising the further step of releasing the first pair when the second pair does not exist so the first pair is used for the first connection.

* * * * *